United States Patent [19]

Wada

[11] Patent Number: 5,175,815
[45] Date of Patent: Dec. 29, 1992

[54] IMAGE PROCESSING SYSTEM

[75] Inventor: Yoshinori Wada, Kanagawa, Japan

[73] Assignee: Ricoh Company, Ltd., Tokyo, Japan

[21] Appl. No.: 793,297

[22] Filed: Nov. 14, 1991

Related U.S. Application Data

[63] Continuation of Ser. No. 470,417, Jan. 29, 1990, abandoned, which is a continuation of Ser. No. 154,036, Feb. 9, 1988, abandoned.

[30] Foreign Application Priority Data

Feb. 9, 1987 [JP] Japan .................. 62-26313

[51] Int. Cl.$^5$ .................................. G06F 15/20
[52] U.S. Cl. ................... 395/162; 364/239.2; 340/723
[58] Field of Search ............... 340/720, 722, 723, 724, 340/747, 750, 728; 382/47, 54; 358/180; 395/162, 161; 364/239.2

[56] References Cited

U.S. PATENT DOCUMENTS

| | | | |
|---|---|---|---|
| 3,903,517 | 9/1975 | Hafner | 358/180 X |
| 4,240,113 | 12/1980 | Michael et al. | 358/180 |
| 4,381,547 | 4/1983 | Ejiri | 382/47 |
| 4,610,026 | 9/1986 | Tabata et al. | 382/47 |
| 4,672,680 | 6/1987 | Middleton | 382/44 |
| 4,682,243 | 7/1987 | Hatayama | 358/287 |
| 4,710,965 | 12/1987 | Kobayashi | 382/41 |
| 4,725,892 | 2/1988 | Suzuki et al. | 358/287 |
| 4,771,279 | 9/1988 | Hannah | 340/728 |

Primary Examiner—Gary V. Harkcom
Assistant Examiner—Phu K. Nguyen
Attorney, Agent, or Firm—Oblon, Spivak, McClelland, Maier & Neustadt

[57] ABSTRACT

An image processing system capable of combining two or more image data having different pixel densities into one page of image data. The system includes a parallel/-serial converter and a serial/parallel converter. A first clock is input into the parallel/serial converter and a second clock is input into the serial/parallel converter. Image data is converted into serial image data by the parallel/serial converter in synchronism with the first clock and then the serial image data is converted into parallel image data by the serial/parallel converter in synchronism with the second clock. By varying the number of clock pulses per unit time between the first and second clocks, the input image data having a first pixel density may be converted into output image data having second pixel density.

5 Claims, 10 Drawing Sheets

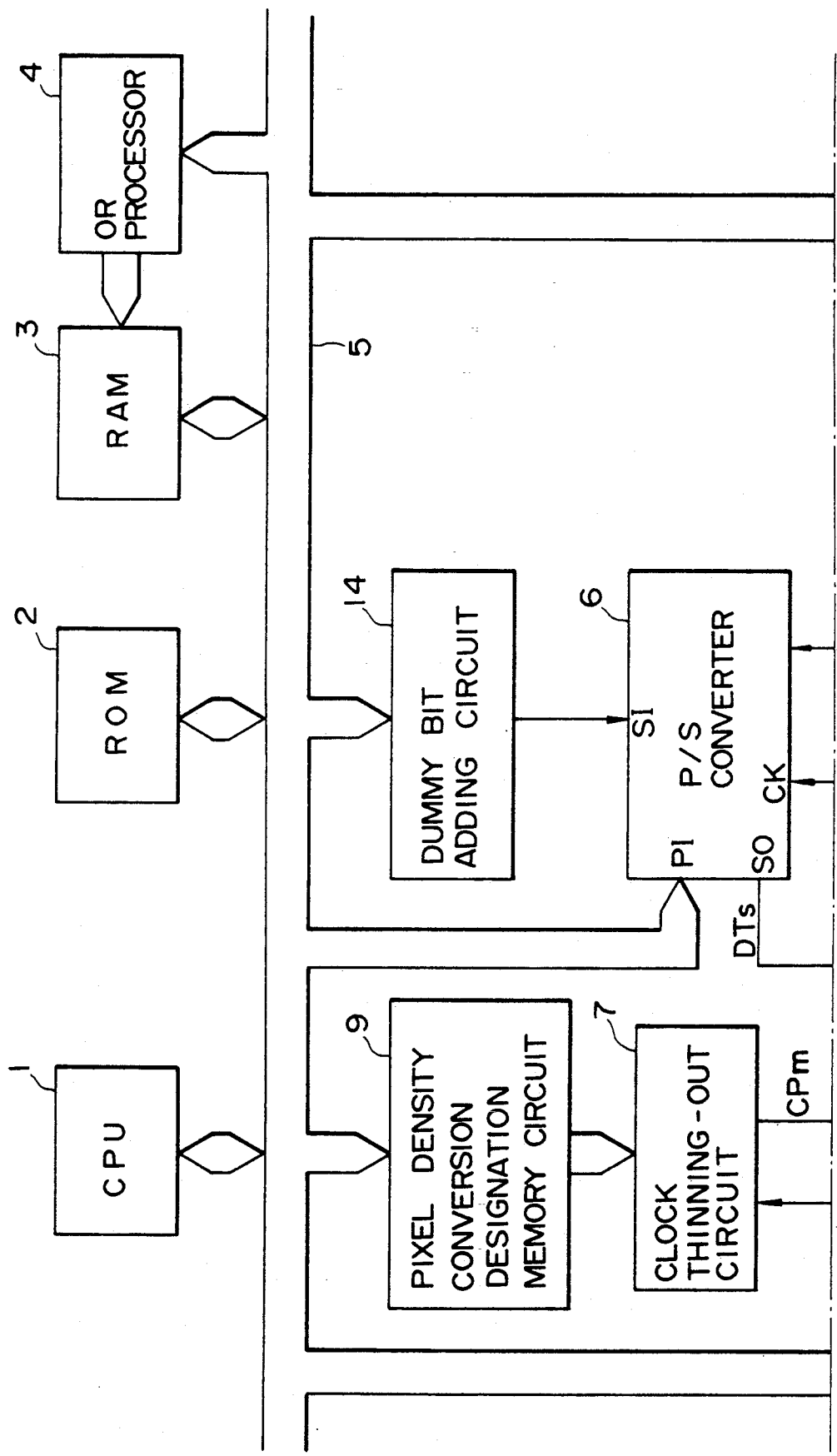

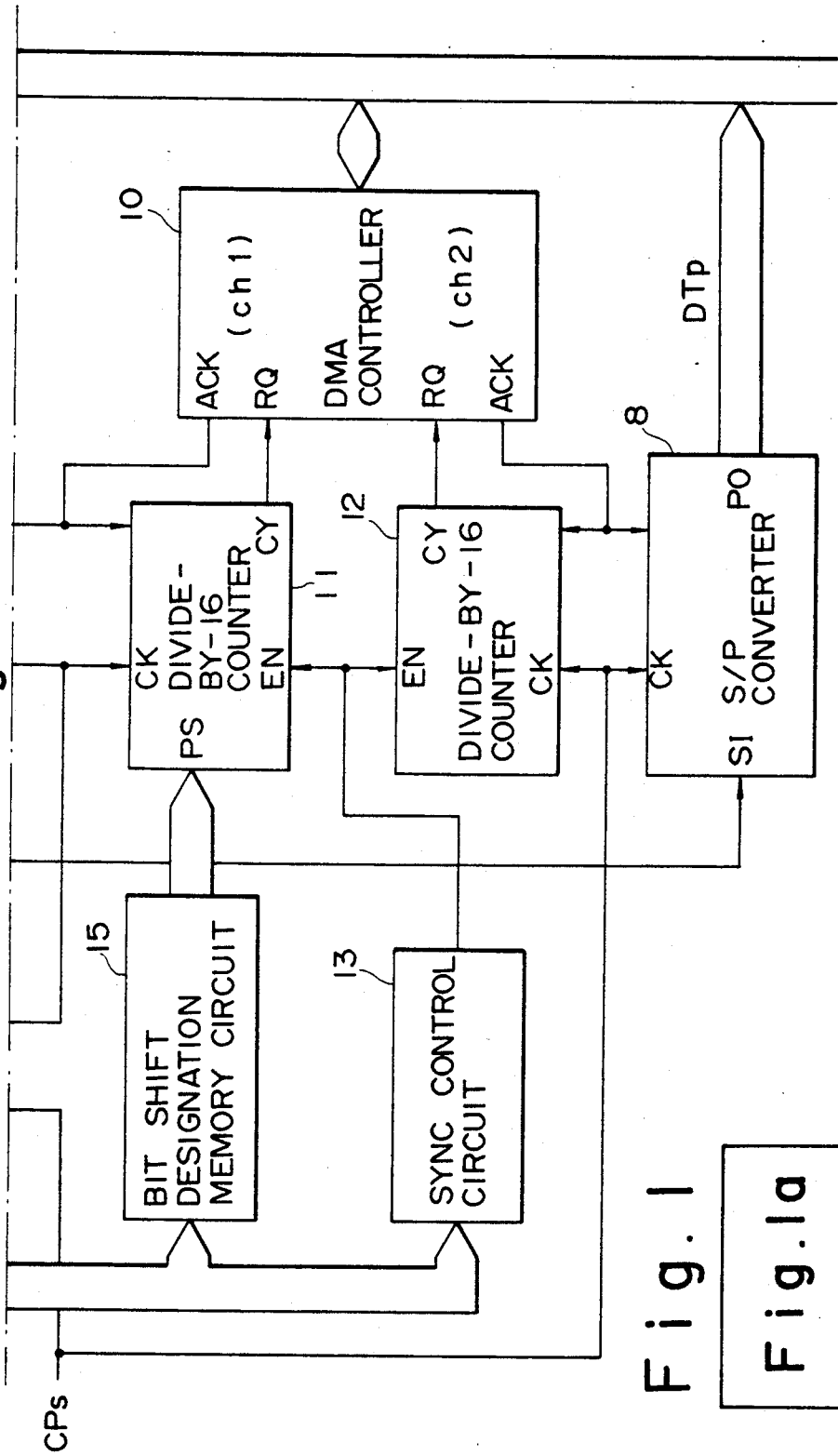

Fig. 4
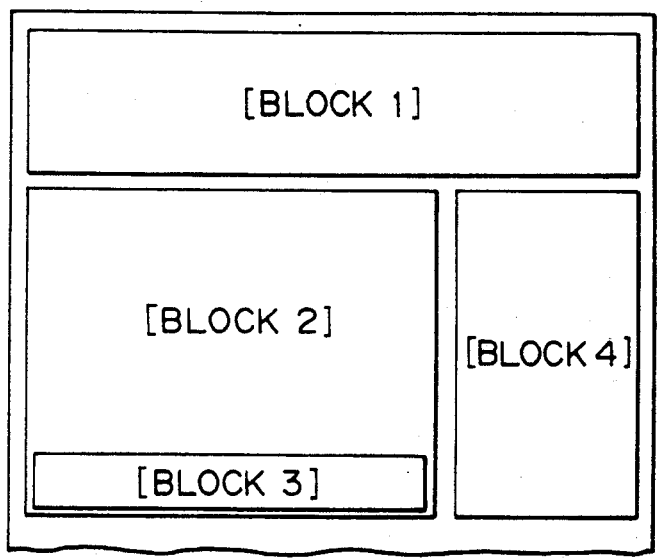
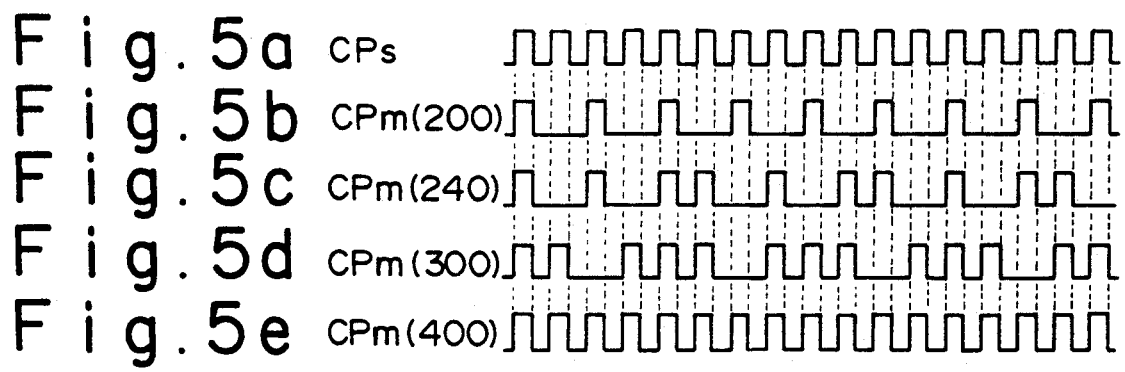
Fig. 5a  CPs
Fig. 5b  CPm(200)
Fig. 5c  CPm(240)
Fig. 5d  CPm(300)
Fig. 5e  CPm(400)

Fig. 6a BEFORE CONVERSION: 1 2 3 4 5 6 7 8 9 10 11 12 (12)

Fig. 6b CPm(200): 1 1 2 2 3 3 4 4 5 5 6 6 7 7 8 8 9 9 10 10 11 11 12 12 (24)

Fig. 6c CPm(240): 1 1 2 2 3 4 4 5 5 6 6 7 7 8 8 9 9 10 10 11 11 12 (20)

Fig. 6d CPm(300): 1 2 2 3 4 5 5 6 7 8 8 9 10 11 11 12 (16)

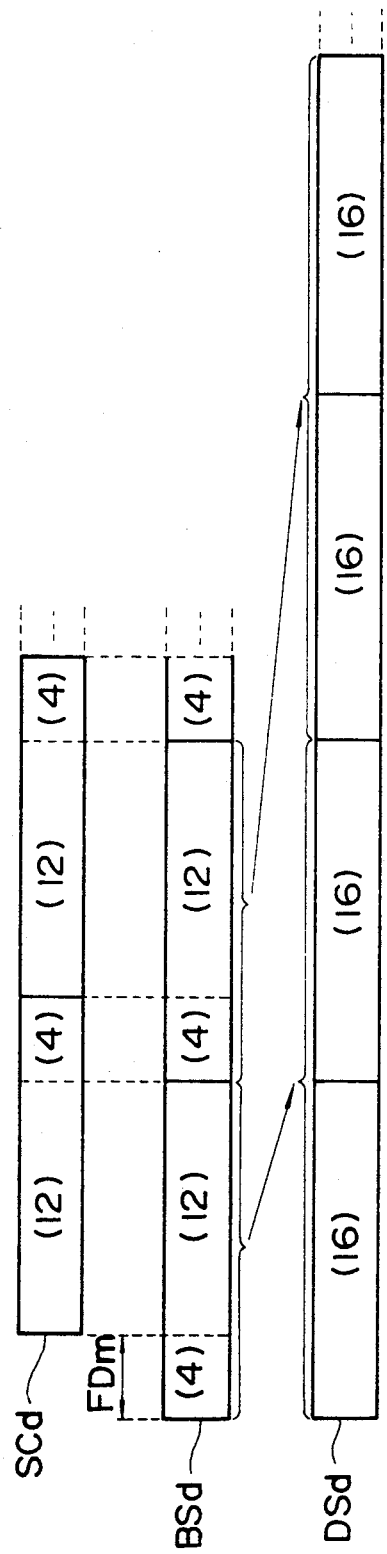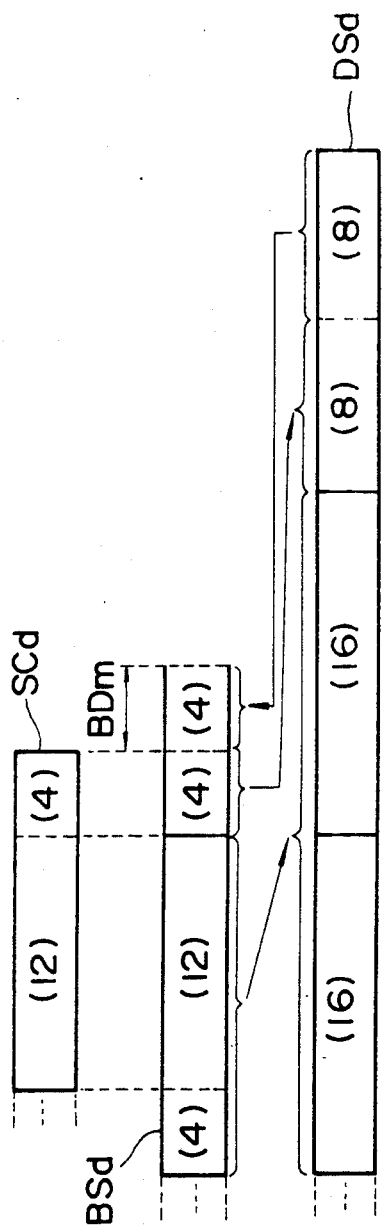

IMAGE PROCESSING SYSTEM

This application is a continuation of application Ser. No. 07/470,417, filed on Jan. 29, 1990, now abandoned, which is a continuation of Ser. No. 07/154,036, filed on Feb. 9, 1988, now abandoned.

BACKGROUND OF THE INVENTION

1. Field of the Invention

This invention generally relates to an image processing system, and, in particular, to an image processing system capable of combining two or more blocks of image data different in pixel density into one page of image data at a predetermined pixel density.

2. Description of the Prior Art

For example, in Class 2 and 3 facsimile machines among Group 4 facsimile machines and also Type 2 teletex machines, in order to realize the so-called mixed mode function, it is required to be capable of receiving or transmitting image data having different pixel densities, and, thus, a pixel density conversion function must be provided.

Conventionally, such a pixel density conversion function was provided in the form of software, for example as disclosed in Japanese Patent Laid-open Publication No. 62-31892, which was filed on Aug. 2, 1985 and published on Feb. 10, 1987. In this case, however, it requires an exorbitant amount of time for combining two or more blocks of image data different in pixel density into one page of document having image data of a predetermined pixel density, and, thus, it is rather disadvantageous in speed. Japanese Patent Laid-open Publications Nos. 60-240275 and 62-11730 disclose similar image processing systems; however, both of these publications fail to teach to combine two or more blocks of image data different in pixel density into one page of image data having a predetermined pixel density.

SUMMARY OF THE INVENTION

In accordance with the principle of the present invention, there is provided an image processing system which comprises parallel/serial converting means for receiving image data and converting the image data into a serial image data. The present system also comprises serial/parallel converting means for receiving the serial image data from the parallel/serial converting means and converting the serial image data into a parallel image data. Also provided in the present system is clock supplying means for supplying a first clock to the parallel/serial converting means and a second clock to the serial/parallel converting means. When the first clock differs from the second clock in frequency, i.e., number of pulses per unit time, the pixel density of the image data is varied when processed through the parallel/serial converting means and then the serial/parallel converting means.

In the preferred embodiment, the clock supplying means includes a clock thinning out circuit whereby the second clock is supplied to the serial/parallel converting means directly and also to the clock thinning out circuit which then supplies the first clock signal to the parallel/serial converting means. In this case, the first clock signal is produced by thinning out the second clock signal, i.e., clock pulses of the first clock signal being removed selectively in a predetermined manner.

In addition, the present invention preferably includes dummy bit adding means for adding dummy bits to the image data depending on the location and size of each block of image data to be combined into one page.

It is therefore a primary object of the present invention to obviate the disadvantage of the prior art as described above and to provide an improved image processing system.

Another object of the present invention is to provide an improved image processing system capable of combining two or more blocks of image data into one page of image data.

A further object of the present invention is to provide an improved image processing system capable of combining two or more blocks of image data different in pixel density.

A still further object of the present invention is to provide an improved image processing system having an pixel density conversion function.

A still further object of the present invention is to provide an improved image processing system high in operation and simple in structure.

Other objects, advantages and novel features of the present invention will become apparent from the following detailed description of the invention when considered in conjunction with the accompanying drawings.

BRIEF DESCRIPTION OF THE DRAWINGS

FIG. 1 is a composite of FIGS. 1a and 1b, which represent block diagram showing the overall structure of an image processing system constructed in accordance with one embodiment of the present invention;

FIG. 4 is an illustration showing four blocks of image data are arranged on a single page;

FIGS. 5a through 5e are timing charts showing several clock signals which may be produced by the clock thinning out circuit provided in the present image processing system of FIG. 1;

FIGS. 6a through 6d are illustrations showing several examples of pixel conversion which may be implemented by the present image processing system of FIG. 1;

FIG. 7a is an illustration which is useful for explaining the roll of pre-dummy bits;

FIG. 7b is an illustration which is useful for explaining the roll of post-dummy bits;

DESCRIPTION OF THE PREFERRED EMBODIMENTS

Referring now to FIG. 1, there is shown in block form an image processing system constructed in accordance with one embodiment of the present invention. The illustrated embodiment is provided with a function for converting image data of one of four different kinds of pixel densities, i.e., 200 (pixels/25.4mm), 240 (pixels/25.4 mm), 300 (pixels/25.4 mm) and 400 (pixels/25.4 mm), to image data having the pixel density of 400 (pixels/25.4 mm) and for combining two or more blocks of image data into a single page of document. As shown in FIG. 1, the present image processing system includes a central processing unit or simply CPU 1, which is in charge of the overall control of the present image processing system, a read only memory or simply ROM 2, which stores a program to be executed by the CPU 1, and a random access memory or simply RAM 3 which serves as a work memory. The RAM 3 also provides a space for storing one or more image block data, which together form a single page of document when combined, and a single page of image data which is formed by combining these image block data as converted to the pixel density of 400 (pixels/25.4 mm) and arranged at respective positions assigned to respective image blocks.

Figure 2:
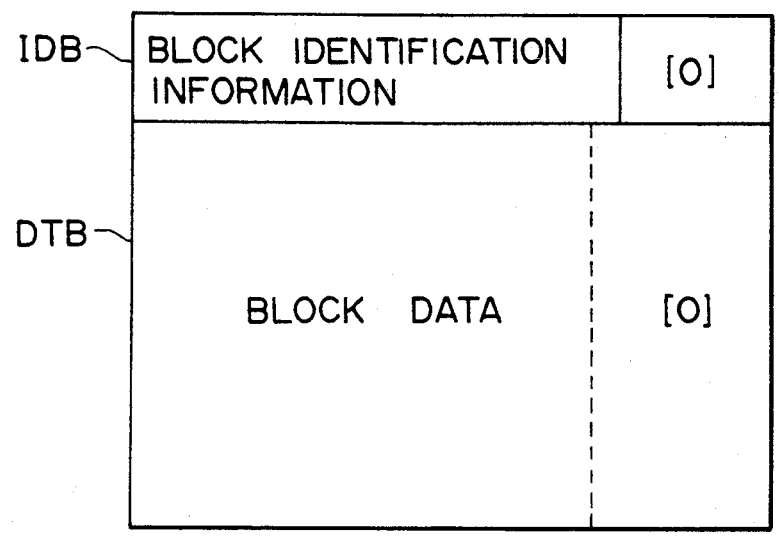
FIG. 2 is an illustration showing one example of image block data for use in the present image processing system shown in FIG. 1.
Figure 3:
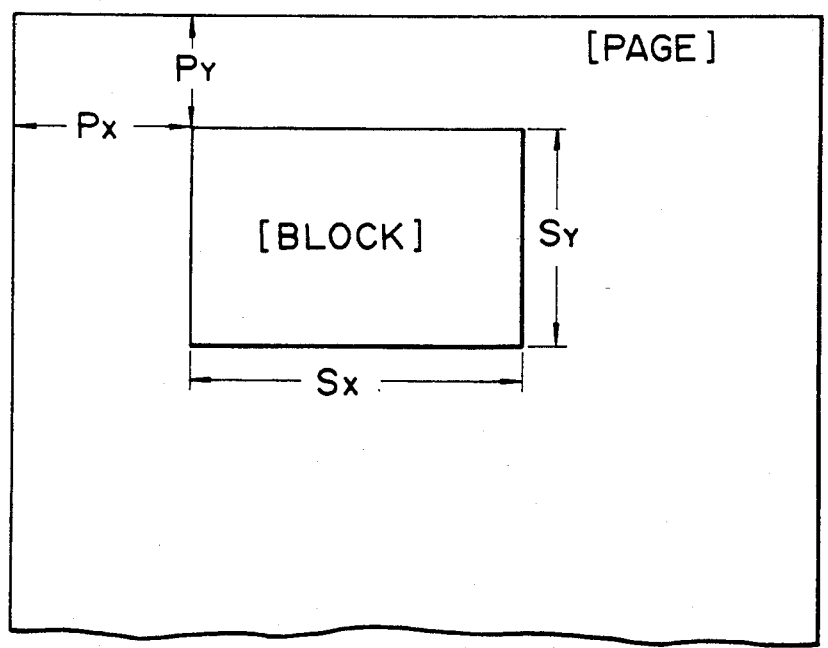
FIG. 3 is an illustration showing an example when an image block is arranged on a page.

As shown in FIG. 2, one image block data includes a block identification information IDB and a block data DTB. As shown in FIG. 3, the block identification information IDB includes such information as position information, which indicates the position of a reference point (top left corner point) of a rectangular block as coordinates Px and Py from a reference point (origin; top left corner point) of one page, size information, which includes size Sx in the X direction and size Sy in the Y direction, the number of bytes per line, the number of lines which constitute a block and pixel density. It is to be noted that the unit of measurement of coordinates Px and Py and sizes Sx and Sy is BMU, i.e., 1 BMU=(2.54/1200) mm.

The block data DTB includes line-by-line image data. And, a fixed length region of 256 or 512 bytes is reserved for the memory region of one line, and 0s are stored in those bytes other than valid bytes. An image block data is transferred from a system controller (not shown) to which the present image processing system is connected, and it is first stored into the RAM 3. It should be noted that character code data is previously converted into bit map data of corresponding character pattern and facsimile coded data is also previously converted into corresponding decoded bit map data by the system controller before being input into the present image processing system.

The present image processing system also includes an OR processor 4. When a block of image data after pixel density convertion processing is to be stored into the RAM 3, the data already stored in the same memory region of the RAM 3 is first read out and these data are ORed by the OR processor 4 before being stored into the RAM 3 again. With this structure, for example as shown in FIG. 4, a desired portion of a block of image may be superimposed on another block of image. In the case shown in FIG. 5, there are arranged four blocks of image data, wherein block 3 is located within block 2, so that a portion of the image data of block 2 is superimposed on the image data of block 3.

As shown in FIG. 1, exchanging of data among the components of the present image processing system is carried out through an internal bus 5 having a 16-bit data bus width. Thus, in this case, it is so structured that, when one address is designated, 16-bit data may be read out from or written into the ROM 12 or RAM 13. Thus, one word is comprised of 16 bits in the present system.

Also provided in the present system shown in FIG. 1 is a parallel/serial converter 6 which receives 16-bit data in parallel from the RAM 3 through the data bus 5 and converts this data into a serial data DTs in synchronism with a thinned-out shift clock CPm supplied from a clock thinning out circuit 7. The serial data DTs thus obtained is then input input a serial/parallel converter 8. The clock thinning out circuit 7 receives a shift clock CPs, which is input into the serial/parallel converter 8 directly, and outputs a thinned-out shift clock CPm by thinning out the shift clock CPs in accordance with pixel density conversion information designated by a pixel density conversion designation memory circuit 9. That is, if the pixel density conversion information of 200, 240, 300 or 400 (pixels/25.4 mm) is designated, the clock thinning out circuit 7 outputs clock CPm(200), CPm(240), CPm(300) or CPm(400) as shown in FIGS. 5b through 5e, respectively, which are produced by thinning out one clock pulse from two consecutive clock pulses of shift clock CPs, two clock pulses from five consecutive clock pulses of shift clock CPs, one clock pulse from four consecutive clock pulses of shift clock CPs or none from shift clock pulse CPs, respectively.

On the other hand, as mentioned above, shift clock CPs is directly input into the serial/parallel converter 8, so that the serial/parallel converter 8 receives the serial data DTs supplied from the parallel/serial converter 6 and outputs a 16-bit parallel data DTp in synchronism with shift clock CPs. The 16-bit parallel data DTp is then stored into the RAM 3 via the data bus 5.

With the above-described structure, as shown in FIGS. 6a through 6d, for example, if thinned out shift clock of CPm(200, 240 or 300) is input into the parallel/serial converter 6, a 12-bit image data is converted into an image data of 24, 20 or 16 bits, respectively. As a result, all of image data different in image density are converted into image data having the same image density 400 (pixels/25.4 mm). As may have been already understood, if thinned out shift clock of CPm(400) is applied, the image data remains unchanged in image density, that is image data input has the same image density as that of the image data output.

The illustrated image processing system also includes a direct memory access controller or simply DMA controller 10 which is provided with a pair of DMA channels Ch1 and Ch2. Through DMA channel Ch1, data transfer of a block of image prior to pixel density conversion from the RAM 3 to the parallel/serial converter 6 is carried out; on the other hand, data transfer of a block of image after pixel density conversion from the serial/parallel converter 8 to the RAM 3 is carried out through the other D channel Ch2. A DMA request for the DMA channel Ch1 of the DMA controller 10 is implemented by a carry output from a divide-by-16 counter 11 which counts thinned out shift clock CPm input into the parallel/serial converter 6; whereas, a DMA request for the DMA channel CH2 is implemented by a carry output from another divide-by-16 counter 12 which counts shift clock CPs input into the serial/parallel converter 6. That is, regarding the DMA channel Ch1, a DMA request is issued upon completion of parallel-to-serial conversion of one word of data (16 bits) by the parallel/serial converter 6; on the other hand, regarding the DMA channel Ch2, a DMA request is made when one word of data has been provided to the serial/parallel converter 8. When a DMA request has been made in this manner, the DMA controller 10 informs the CPU 1 to carry out a DMA operation, and when such a request is granted, a DMA grant signal is supplied to the requestee to carry out the DMA operation for one word. It should also be noted that in order to prevent bus collision from occurring by such DMA request, the operations of divide-by-16 counters 11 and 12 are controlled by a sync control circuit 13.

Now, there is a case in which coordinate Px, indicating the start position of a block in the line direction, which is set in block identification information IDB of image block data, does not agree with the word boundary of the image data prior to pixel density conversion operation. For example, in the case where coordinate Px of an image block having the pixel density of 200 (pixels/25.4 mm) is expressed by (nX96+4) BMU, the data of the first word in each line of block data DTB is shifted in position by 24 BMU or 4 bits in 200 (pixels/25.4 mm). Accordingly, the original image data SCd, which has not been subjected to pixel density conversion processing, is shifted over four bits corresponding to the amount of discrepancy between the front end of a line and its word boundary (hereinafter, referred to as pre-dummy bits FDm) to thereby define bit-shifted image data BSd. And, by subjecting this bit-shifted image data BSd to pixel density convertion processing, there can be obtained image data DSd which is properly arranged word by word (see FIG. 7a). Similarly, the last word of the original image data SCd remains by the amount corresponding to the pre-dummy bits FDm. Thus, in order to allow to obtain one word of image data DSd when this remaining portion of the image data has been subjected to pixel density conversion processing, post-dummy bits BDm having corresponding number of bits is added (see FIG. 7b).

In the illustrated example, the remaining image data SCd has four bits and, when this remaining image data were subjected to pixel density conversion processing, there would result an 8-bit image data DSd; however, this is insufficient to define one word of image data DSd by eight bits. In this case, since the original image data SCd which corresponds to this lacking eight bits is four bits, four bits of post-dummy bits BDm are added. In order to add pre-dummy bits FDm and post-dummy bits BDm suitably as described above, there are provided a dummy bit adding circuit 14 and a bit shift designation memory circuit 15 in the image processing system shown in FIG. 1. The dummy bit adding circuit 14 inputs the number of bits of data "0" designated by the CPU 1 from the front bit to the lower bit of the parallel/serial converter 6 in sequence. On the other hand, the bit shift designation memory circuit 15 stores the bit shift designation information which is equal to the value obtained by subtracting the number of dummy bits added by the dummy bit adding circuit 14 from sixteen (16), and this information is supplied to the preset input terminal of the divide-by-16 counter 11.

Figure 8:
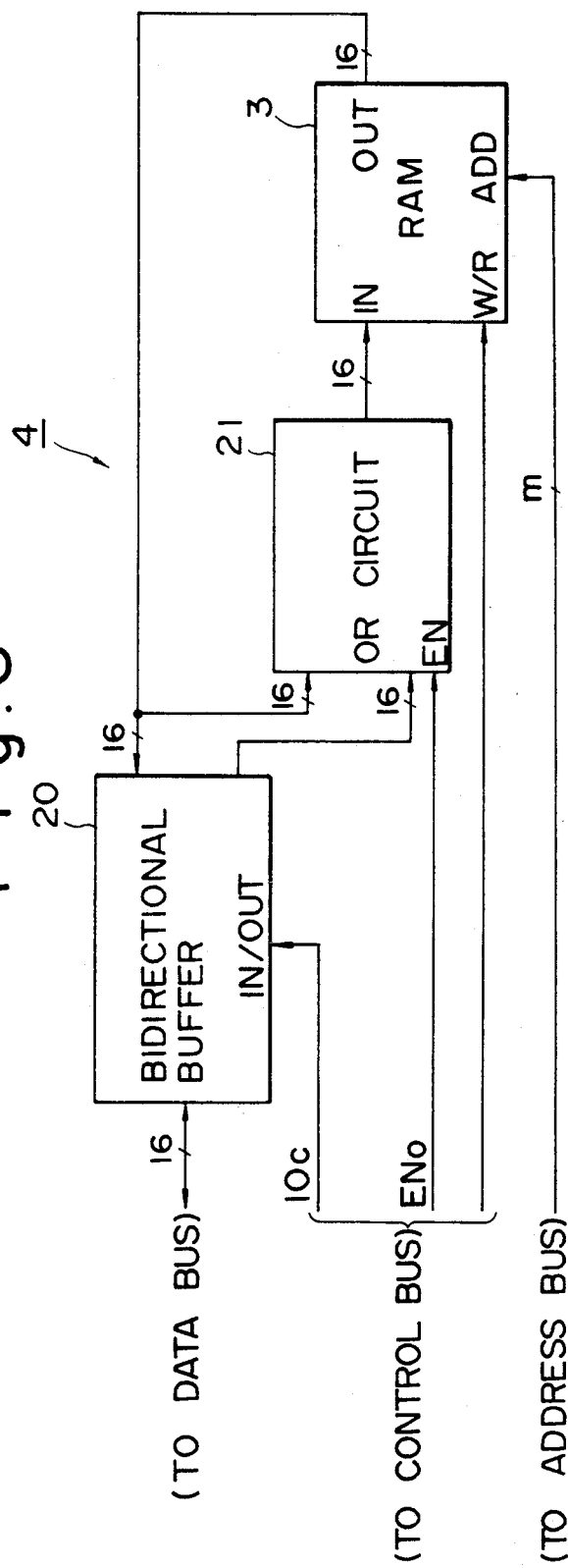
FIG. 8 is a block diagram showing one example of the OR processor provided in the present image processing system of FIG. 1.

FIG. 8 shows the detailed structure of one example of the OR processor 4 provided in the image processing system shown in FIG. 1. As shown, the OR processor 4 includes a bidirectional buffer 20 which serves to connect the data input/output terminal of the RAM 3 to the data bus 5. An OR circuit 21 is provided as connected between the bidirectional buffer 20 and the data input terminal of the RAM 3. The data output from the data output terminal of the RAM 3 is supplied not only to the bidirectional buffer 20, but also to the OR circuit 21. When an enable signal ENo is supplied to the OR circuit 21 from the CPU 1, the data read out from the RAM 3 and the data output from the bidirectional buffer 20 to the RAM 3 are ORed in parallel for sixteen bits, and its result is supplied to the RAM 3. In this case, the RAM 3 is operated in a read/modify/write mode, in which the data after having been read out is once again stored in the same address, so that the data modified by the OR circuit 21 is once again stored in the same address. In order for the RAM 3 to be operative in this read/modify/write mode, use may be made of a dynamic random access memory for the RAM 3.

Figure 9:
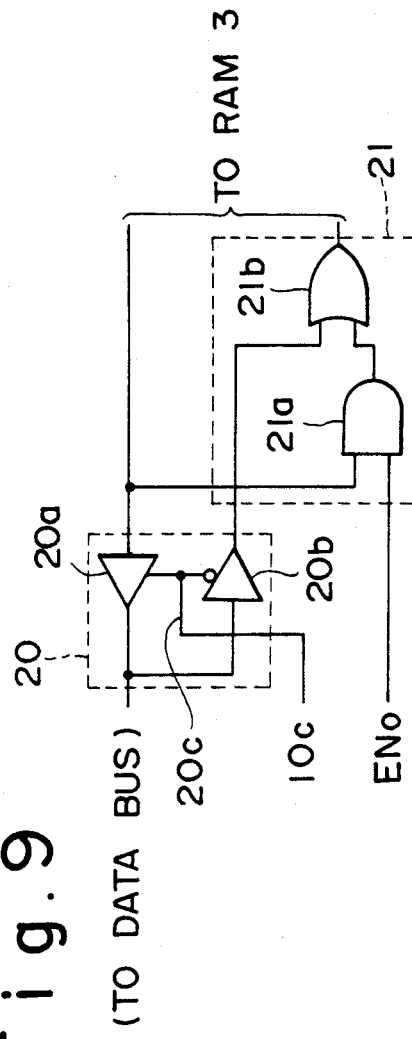
FIG. 9 is a circuit diagram showing the structure of the OR processor per bit.

FIG. 9 illustrates the structure for one bit in the bidirectional buffer 20 and the OR circuit 21. The bidirectional buffer 20 includes a three-state buffer 20a for outputting a data to the data bus, a three-state buffer 20b for inputting data from the data bus, and a control line 20c for causing one of the three-state buffers 20a and 20b active exclusively from one another. An input/output command signal 10c from the CPU 1 is supplied to this control line 20c. On the other hand, the OR circuit 21 includes an AND circuit 21a, which has its one input terminal connected to the input terminal of the three-state buffer 20a and other input terminal connected to receive the enable signal ENo, and an OR circuit 21b, which has its one input terminal connected to the output terminal of the AND circuit 21a and its other input terminal connected to the output terminal of the three-state buffer 20b. Thus, when the enable signal ENo is applied, the AND circuit 21a is enabled so that the data output from the RAM 3 is supplied to the OR circuit 21b through the AND circuit 21a, whereby the data from the bidirectional buffer 20 and the data from the AND circuit 21a are ORed and its result is supplied to the RAM 3. On the other hand, if the enable signal ENo is not input, the AND circuit 21a is disabled, so that the data stored at the selected address of the RAM 3 is altered by the data input through the bidirectional buffer 20.

Figure 10:
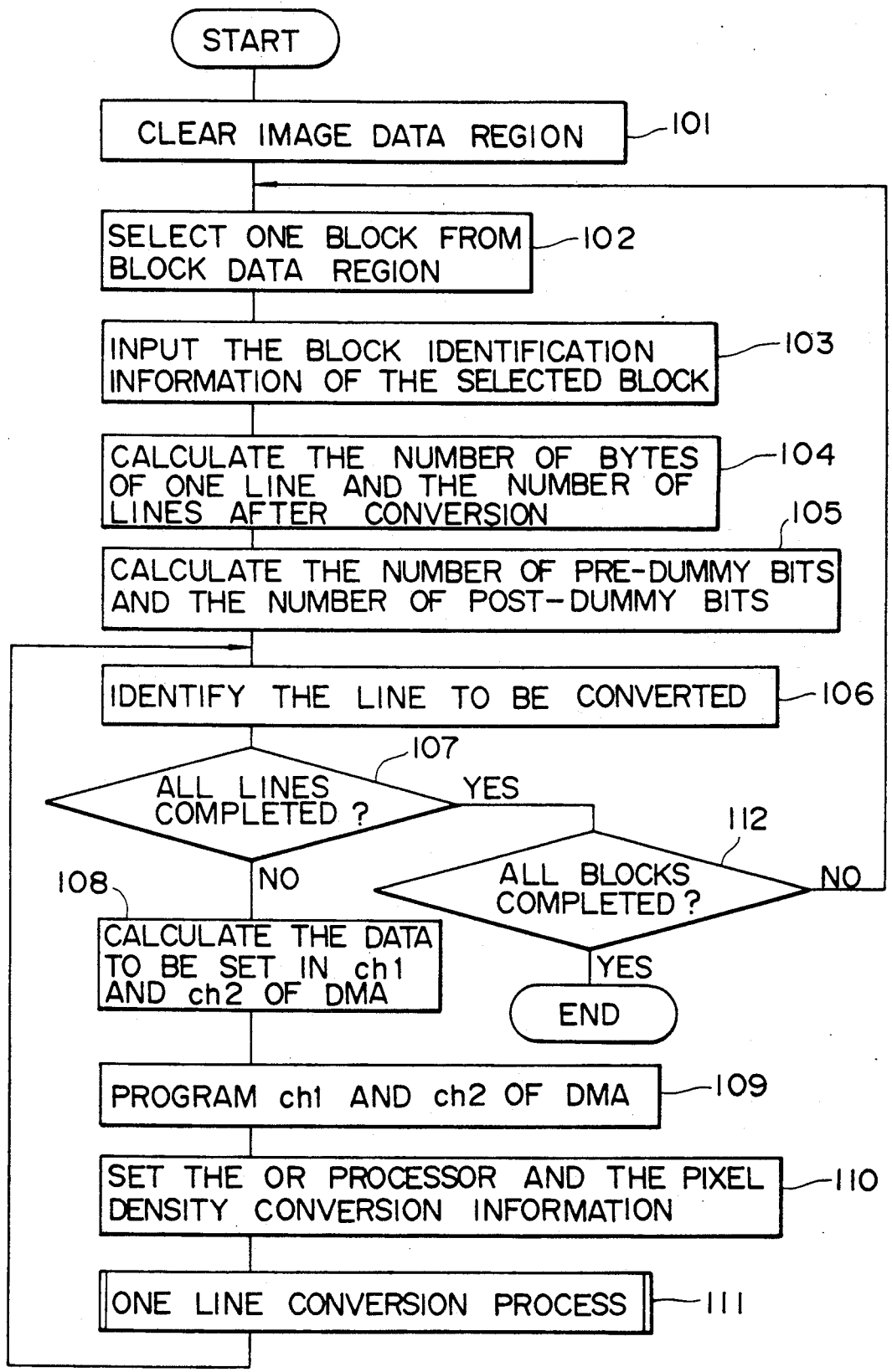
FIG. 10 is a flow chart showing the sequence of steps of a pixel density conversion process according to one embodiment of the present invention.

With the above-described structure, when the image block data stored in the RAM 3 is to be combined or integrated into image data, the CPU 1 executes the process shown in FIG. 10. That is, in the first place, the CPU 1 clears the entire image data region of the RAM 3 to be all white (step 101) and selects one image block from the image block data region of the RAM 3 (step 102), followed by the step of reading the block identification information IDB of the thus selected image block (step 103). Then, the conversion rate is calculated based on the pixel density of the block identification information IDB and the conversion rate is multiplied by the number of bytes per line of the block identification information IDB to thereby obtain the number of bytes per line of image data after pixel density conversion processing and at the same time the conversion rate is also multiplied by the number of lines of the block identification information IDB to calculate the number of lines of image data after conversion processing (step 104). In addition, the number of pre-dummy bits and also the number of post-dummy bits are also calculated (step 105).

Figure 11A:
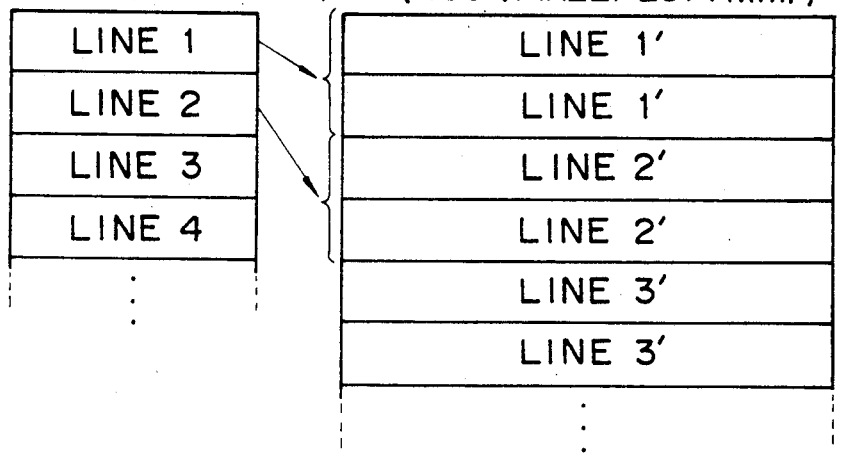
FIGS. 11a through 11c are illustrations showing a few examples of a scheme for increasing the number of lines.
Figure 11B:
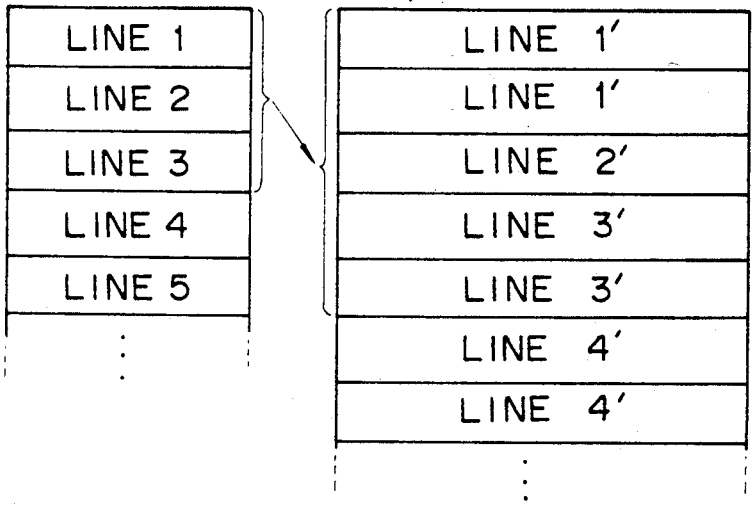
Figure 11C:
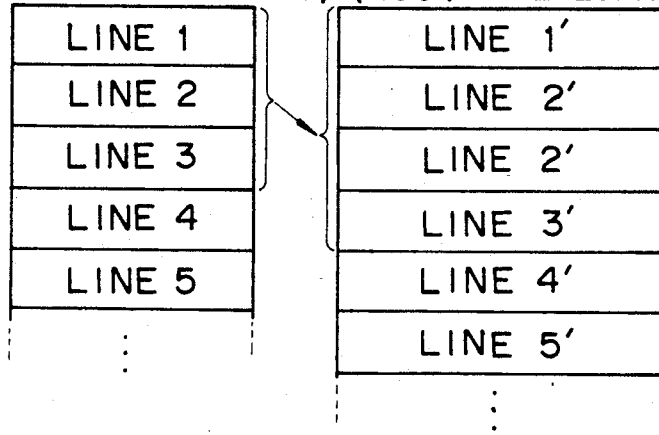

It is to be noted that in the present embodiment the pixel density conversion in the amine scanning direction (or optical scanning direction) is implemented by hardware; however, the pixel density conversion in the auxiliary scanning direction (normal to the optical scanning direction) is implemented by software. That is, if the original image block is 200 (pixels/25.4 mm), the same line of the original image block is produced as image data twice to thereby double the number of lines (see FIG. 11a). If the original image block is 240 (pixels/25.4 mm), treating consecutive three liens of the original image block as one unit, each of its first and third lines is produced twice as image data to thereby increase the number of lines by the factor of 5/3 (see FIG. 11b). On the other hand, if the original image block is 300 ) pixels/25.4 mm), then treating consecutive three lines of the original image block as a unit, its second line is produced twice as image data to thereby increase the number of lines by the factor of 4/3 (see FIG. 11c).

Then, in accordance with this scheme of increasing the number of lines, the lines forming the image data which has been subjected to pixel density conversion processing are identified (step 106). Now, for the image block which is being selected current, it is checked whether or not the processing for all of the lines have been completed (step 107), and if the result of determination at step 107 is negative, the number of words to be transferred, which is to be set at DMA channel Ch1 and DMA channel Ch2 of the DMA controller 10, and the address of the RAM 3 for starting the transfer are calculated (step 108). That is, the number of words to be transferred, which is to be set in the DMA channel Ch1, is the number of words per line stored in the block identification information IDB, and the address of the RAM 3 for starting transfer is the front address in the region in whcih the data of the line to be converted of the selected image block data is stored. Similarly, the number of words to be transferred to be set in the DMA channel Ch2 is the number of words per line after the pixel density conversion processing. In addition, the address of the RA M for initiating transfer is determined by coordinate Px of the block stored in the block identification information IDB and the order of the line after the pixel density conversion processing.

Next, based on the calculated results, the mode of operation of the DMA channel CH2 and DMA channel Ch2 of the DMA controller 10, number of words to be transferred and transfer start address are programmed (step 109). And, the operating condition of the OR processor 4 is set and the pixel density conversion information is set in the pixel density conversion designation memory circuit 9 (step 110). Under the condition, one line conversion process (step 111) is implemented to carry out the pixel density conversion process for one line and the production of image data. Thereafter, it goes back to step 106.

On the other hand, if the result of determination at step 107 is affirmative, it is determined whether or not the pixel density conversion processing has been completed for all of the blocks (step 112), and, if the result of determination at step 112 is negative, it goes back to step 102 to enter into the next cycle of operation for processing the next image data. On the other hand, if the result of determination at step 112 is affirmative, it goes out of the present process.

Figure 12:
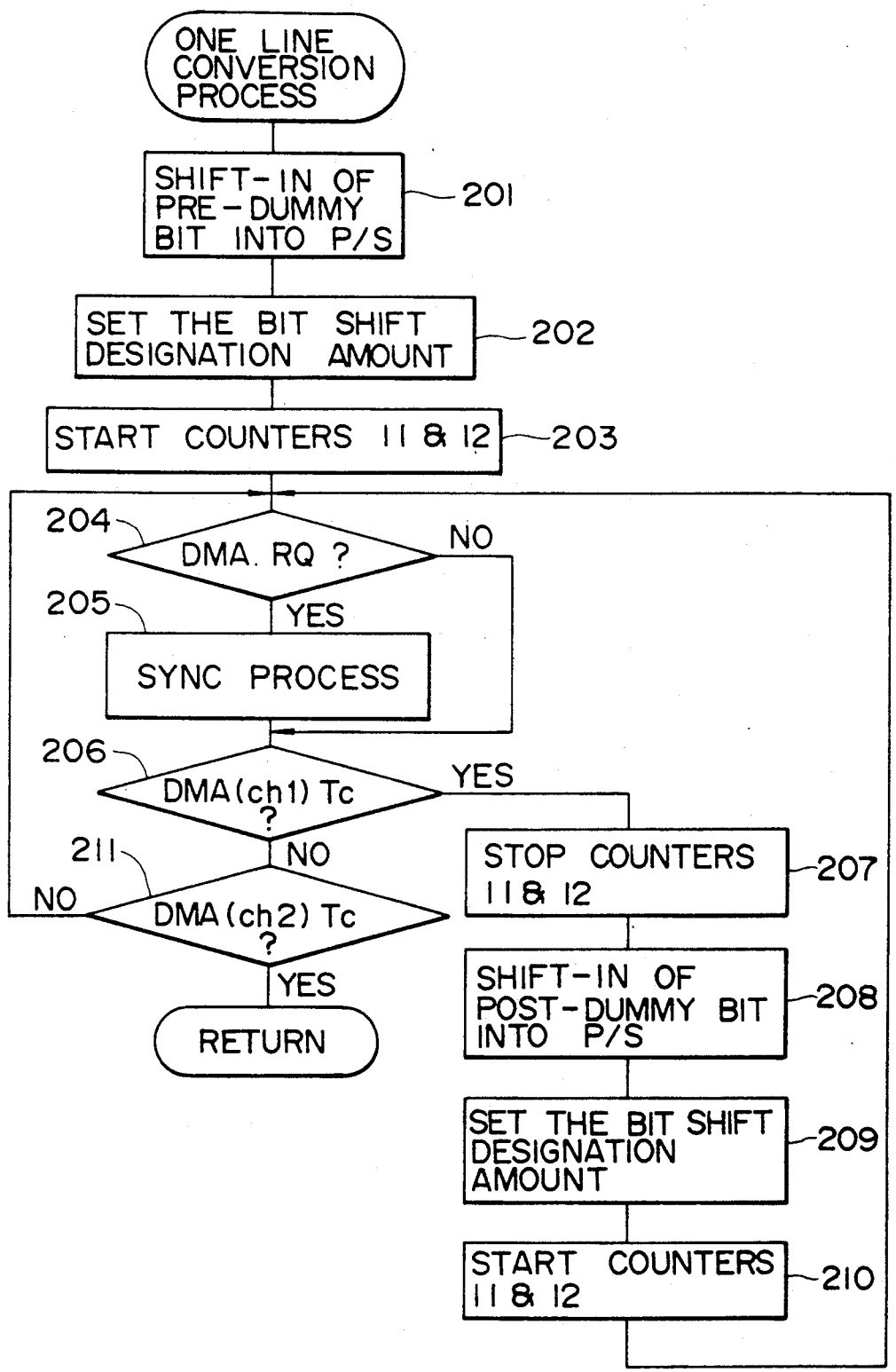
FIG. 12 is a flow chart showing the sequence of steps of a one line conversion process in accordance with one embodiment of the present invention.

FIG. 12 shows one example of the one line conversion process (step 111 in FIG. 10). In the first place, after shifting pre-dummy bits into the parallel/serial converter 6 (step 201), a bit shift designated amount is stored into the bit shift designation memory circuit 15 and it its preset in the divide-by-16 counter 11 (step 202) to thereby cause the counters 11 and 12 to start to count (step 203). And, through a loop including determination steps 204, 206 and 211, it is monitored to see whether the DMA controller 10 has issued a DMA request and whether either one of the DMA channels Ch1 and Ch2 has completed the transfer of all the set number of words. And, if the result of determination at step 204 is affirmative, since DAM transfer has been requested, the divide-by-16 counters 11 and 12 are stopped by the sync control circuit 13 (step 205). And, if the result of determinations at step 206 is affirmative, since it indicates the fact that the transfer of one line of data prior to the pixel density conversion process has been completed, the divide-by-16 counters 11 and 12 are once stopped (step 207). Then, post-dummy bits are shifted into the parallel/serial converter 6 (step 208) and the bit shift designated amount is stored in the bit shift designation memory circuit 15 and also preset in the divide-by-16 counter 11 (step 209), thereby starting the counters 11 and 12 to count (step 210).

On the other hand, if the result of determination at step 211 is affirmative, since it indicates the completion of transfer one one line of data after the pixel density conversion processing, this process is terminated and goes back to the process shown in FIG. 10. That is, in the first place, pre-dummy bits are shifted into the parallel/serial converter 6, and with the bit shift amount corresponding to the pre-dummy bits being set in the divide-by-16 counter 11, the operation of each of the counters 11 and 12 is initiated. When the pre-dummy bits have been shifted into the serial/parallel converter 8 from the parallel/serial converter 6 as the data having the number of bits corresponding to the pixel density convertion rate, a carry signal is output from the divide-by-16 counter 11, so that the first word of data of the selected line prior to the pixel density convertion processing is input into the parallel/serial converter 6 by the DMA controller 10. And, every time when a carry signal is output from the divide-by-16 counter 11, one word of data of the same line is similarly input into the parallel/serial converter 6 is sequence.

When a carry signal is output from the divide-by-16 counter 12 because one word of data after the pixel density conversion processing has been supplied to the serial/parallel converter 8, the one word of data in the serial/parallel converter 8 is stored into the memory region of the first word of the selected line by the DMA controller 10. And, every time when a carry signal is output from the divide-by-16 counter 12, the data of the serial/parallel converter 8 is similarly stored into the memory region of the corresponding word of the same line. And, upon completion of transfer of one line of image data before the pixel density conversion processing to the parallel/serial converter 6, the post-dummy bits are shifted into the parallel/serial converter 6 to thereby carry out the pixel density conversion processing for the last word. And, when the transfer of a word after the pixel density conversion processing has also be completed, one line of pixel density conversion processing is completed.

Such pixel density conversion processing for one line is carried out for one image block data, and when it has been carried out for all of the image block data, there is obtained one page of data (bit map data) having a predetermined pixel density in the image data region of the RAM 3.

The CPU 1 causes the superimposing process by the OR processor 4 to be carried out at all times in the image data region other than that portion of the image data region where superimposition is inhibited, such as call identification row. With this structure, superimposition of image data is carried out appropriately by the OR processor 4, so that there is obtained an image data having a preset condition. If information regarding the overlapping or superimposing condition is contained in the block identification information IDB of image block data, the degree of overlapping or superimposed portions of image blocks may be adjusted. In addition, it may also be so structured to define special information which indicates the degree of overlapping image portions and to overlap the images in accordance with this special information. It should also be noted that the manner of thinning out the shift clock by the clock thinning out circuit may be set in any other manner than that described above. It should also be noted that the principle of the present invention may also be applied to a pixel density conversion apparatus other than that described above. Furthermore, the present invention is also applicable to any image processing system with or without the so-called mixed mode function.

While the above problems a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An image processing system comprising:
    parallel/serial converting means for receiving image data and converting said image data into a serial image data;
    serial/parallel converting means for receiving said serial image data from said parallel/serial converting means and converting said serial image data into parallel image data;
    clock signal supplying means for supplying a first clock to said parallel/serial converting means and a second clock to said serial/parallel converting means;
    memory means for storing said parallel image data;
    whereby said parallel/serial converting means carries out a first converting operation in synchronism with said first clock and said serial/parallel converting means carries out a second converting operation in synchronism with said second clock, in order to convert image block data stored in said memory means into a predetermined pixel density;
    means for calculating the number of bits per line after said first image data conversion based on the position of said block in relation to a reference point and the size of said image block, so that any deference between the beginning of a word in the image data before the first conversion and the desired beginning position of the word after said first conversion, is calculated as post-dummy bits, and if the number of bits in a line exceeds a whole multiple of the number of bits in one word, the excess number of bits are also calculated as post-dummy bits;
    dummy bits adding means for adding the number of calculated post-dummy bits designated by said means for calculating sequentially from a leading bit to a tailing bit of the serial image data from the parallel/serial converting means.

2. The system of claim 1, wherein said image data has a first pixel density and said parallel image data has a second pixel density, which may be different from said first pixel density.

3. The system of claim 2, wherein said first clock has a first frequency having a first number of clock pulses per unit time and said second clock has a second frequency having a second number of clock pulses per unit time, whereby said first number may be different from said second number.

4. The system of claim 1, wherein said clock signal supplying means includes a clock thinning out circuit which receives said second clock pulse and produces said first clock pulse by thinning out said second clock pulse.

5. The system of claim 4, further comprising designating means operatively coupled to said clock thinning out circuit for designating a pixel density conversion rate, whereby the thinning out rate by said clock thinning out circuit is determined by the pixel density conversion rate designated by said designating means.

* * * * *